US009319997B2

(12) United States Patent
Mohan et al.

(10) Patent No.: US 9,319,997 B2
(45) Date of Patent: Apr. 19, 2016

(54) APPARATUS, METHOD, AND SYSTEM FOR UPLINK POWER CONTROL IN A HETEROGENEOUS WIRELESS COMMUNICATION NETWORK

(71) Applicant: QUALCOMM Incorporated, San Diego, CA (US)

(72) Inventors: Siddharth Mohan, San Diego, CA (US); Rohit Kapoor, San Diego, CA (US); Haitong Sun, San Diego, CA (US); Sharad Deepak Sambhwani, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 148 days.

(21) Appl. No.: 14/026,986

(22) Filed: Sep. 13, 2013

(65) Prior Publication Data
US 2014/0080529 A1    Mar. 20, 2014

Related U.S. Application Data

(60) Provisional application No. 61/702,615, filed on Sep. 18, 2012.

(51) Int. Cl.
*H04B 7/00* (2006.01)
*H04W 52/24* (2009.01)
(Continued)

(52) U.S. Cl.
CPC .......... *H04W 52/244* (2013.01); *H04W 52/146* (2013.01); *H04W 52/40* (2013.01)

(58) Field of Classification Search
CPC .. H04W 52/146; H04W 52/327; H04W 52/24
See application file for complete search history.

(56) References Cited

U.S. PATENT DOCUMENTS

2005/0141454 A1* 6/2005 Jain ................... H04L 1/0002 370/331
2005/0169301 A1* 8/2005 Jain ................... H04W 52/12 370/464

(Continued)

FOREIGN PATENT DOCUMENTS

| AT | WO 2005125040 A2 * | 12/2005 | .......... H04W 52/146 |
| WO | WO-2005125040 A2 | 12/2005 | |
| WO | WO 2005125040 A2 * | 12/2005 | |

OTHER PUBLICATIONS

3rd Generation Partnership Project, Technical Specification Group Radio Access Network, Physical Layer Procedures(FDD) (Release 11), 3GPP Standard, 3GPP TS 25.214, 3rd Generation Partnership Project (3GPP), Mobile Competence Centre, 650, Route Des Lucioles, F-06921 Sophia-Antipolis Cedex, France, No. V11.2.0, Jun. 26, 2012, pp. 1-108, XP050580745, (retrieved on Jun. 26, 2012).

(Continued)

*Primary Examiner* — Edward Urban
*Assistant Examiner* — Mohammed Rachedine
(74) *Attorney, Agent, or Firm* — Loza & Loza LLP

(57) ABSTRACT

Apparatus and methods are disclosed for power control of uplink transmissions by a user equipment in a way that can reduce interference to neighbor cells. Various aspects of the disclosure decouple the power control for uplink data transmissions from the power control for uplink for a control channel transmissions. For example, one type of power control command may be utilized to control the power the UE utilizes to transmit data channels such as the DPDCH and/or the E-DCH (e.g., the E-DPDCH and the E-DPCCH). Further, another type of power control command may be utilized to control the power the UE utilizes to transmit control channels such as the HS-DPCCH. In this way, the uplink data channels, which can cause substantial interference to neighbor cells, can be power controlled by those neighbor cells to reduce that interference. Moreover, the control channel corresponding to the downlink data transmissions can be controlled by the downlink serving cell, thus ensuring reliable feedback corresponding to those downlink transmissions.

20 Claims, 11 Drawing Sheets

(51) Int. Cl.
*H04W 52/14* (2009.01)
*H04W 52/40* (2009.01)

(56) References Cited

U.S. PATENT DOCUMENTS

| | | | |
|---|---|---|---|
| 2008/0285522 A1* | 11/2008 | Ma | H04W 52/08 370/335 |
| 2009/0149210 A1* | 6/2009 | Hosokawa | H04L 1/0019 455/522 |
| 2010/0238892 A1* | 9/2010 | Dahlman | H04W 52/146 370/329 |
| 2011/0081939 A1* | 4/2011 | Damnjanovic | H04W 52/08 455/522 |
| 2011/0243087 A1* | 10/2011 | Ahn | H04W 52/146 370/329 |

OTHER PUBLICATIONS

International Search Report and Written Opinion—PCT/US2013/059972—ISA/EPO—Nov. 27, 2013.
Samsung et al., "HS-DPCCH Power Using the Special Pilot Bits in HS-DPCCH (Revision of R1-02-0562)", 3GPP Draft; R1-02-0636 HS-Pilot Simulation REV1, 3rd Generation Partnership Project (3GPP), Mobile Competence Centre; 650, Route Des Lucioles; F-06921 Sopia Antipolis Cedex; France, vol. RAN WG1, No. Paris, France; Apr. 15, 2002, XP050096191, (retrieved on Apr. 15, 2002).

* cited by examiner

APPARATUS, METHOD, AND SYSTEM FOR UPLINK POWER CONTROL IN A HETEROGENEOUS WIRELESS COMMUNICATION NETWORK

CROSS-REFERENCE TO RELATED APPLICATIONS

This application claims priority to and the benefit of provisional patent application No. 61/702,615 filed in the United States Patent Office on Sep. 18, 2012, the entire content of which is incorporated herein by reference.

TECHNICAL FIELD

Aspects of the present disclosure relate generally to wireless communication systems, and more particularly, to interference mitigation in heterogeneous wireless communication systems.

BACKGROUND

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). UMTS, which is the successor to Global System for Mobile Communications (GSM) technologies, currently supports various air interface standards, such as Wideband-Code Division Multiple Access (W-CDMA), Time Division—Code Division Multiple Access (TD-CDMA), and Time Division—Synchronous Code Division Multiple Access (TD-SCDMA). UMTS also supports enhanced 3G data communications protocols, such as High Speed Packet Access (HSPA), which provides higher data transfer speeds and capacity to associated UMTS networks.

Recently, heterogeneous networks have been an area of intense interest due to their promise of improved wireless coverage in otherwise difficult-to-cover areas like train stations, tunnels, office buildings, and homes. A heterogeneous network may include conventional high-power nodes, sometimes called macrocells, as well as various low-power nodes such as microcells, picocells, and femtocells, with varying capacities, coverage areas, and power capabilities. However, with such a deployment where different base stations have different power levels, a number of issues can arise relating to interference between the different base stations, or between user equipment served by one or the other type of base station. Additionally, due to the varying power capabilities of the different types of base stations, when one type of base station sends a power control command to a user equipment, e.g., to reduce interference from its uplink transmissions, this can adversely affect reception of those transmissions by another type of base station.

As the demand for mobile broadband access continues to increase, research and development continue to advance the UMTS technologies not only to meet the growing demand for mobile broadband access, but to advance and enhance the user experience with mobile communications.

SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Apparatus and methods are disclosed for power control of uplink transmissions by a user equipment in a way that can reduce interference to neighbor cells, as well as enable power savings at user equipment. Various aspects of the disclosure decouple the power control for uplink data transmissions from the power control for uplink for a control channel transmissions. For example, one type of power control command may be utilized to control the power the UE utilizes to transmit a first set of channels, e.g., data channels such as the E-DPDCH and the DPDCH. Further, another type of power control command may be utilized to control the power the UE utilizes to transmit a second set of channels, e.g., control channels such as the HS-DPCCH. In this way, the uplink data channels, which can cause substantial interference to neighbor cells, can be power controlled by those neighbor cells to reduce that interference. Moreover, the control channel corresponding to the downlink data transmissions can be controlled by the downlink serving cell, thus ensuring reliable feedback corresponding to those downlink transmissions.

In one aspect, the disclosure provides a method of wireless communication operable at a user equipment (UE). Here, the method includes receiving a first power control command adapted to control a transmit power corresponding to a first set of channels, receiving a second power control command adapted to control a transmit power corresponding to a second set of channels, transmitting the first set of channels in accordance with the first power control command, and transmitting the second set of channels in accordance with the second power control command.

In another aspect, the disclosure provides a method of wireless communication operable at a network node. Here, the method includes determining that a first cell in a radio network subsystem (RNS) corresponding to the network node is experiencing high interference from a user equipment (UE), and instructing the first cell to transmit a power control command adapted to control a transmit power corresponding to one or more channels for control information corresponding to a received downlink transmission, independently of a transmit power corresponding to one or more channels for uplink data transmission.

In another aspect, the disclosure provides a wireless user equipment (UE) that includes means for receiving a first power control command adapted to control a transmit power corresponding to a first set of channels, means for receiving a second power control command adapted to control a transmit power corresponding to a second set of channels, means for transmitting the first set of channels in accordance with the first power control command, and means for transmitting the second set of channels in accordance with the second power control command.

In another aspect, the disclosure provides a network node configured for wireless communication, which includes means for determining that a first cell in a radio network subsystem (RNS) corresponding to the network node is experiencing high interference from a user equipment (UE), and means for instructing the first cell to transmit a power control command adapted to control a transmit power corresponding to one or more channels for control information corresponding to a received downlink transmission, independently of a transmit power corresponding to one or more channels for uplink data transmission.

In another aspect, the disclosure provides a wireless user equipment (UE) that includes at least one processor, a memory coupled to the at least one processor, and a communications interface coupled to the at least one processor. Here, the at least one processor is configured to receive a first power control command adapted to control a transmit power corresponding to a first set of channels, to receive a second power control command adapted to control a transmit power corresponding to a second set of channels, to transmit the first set of channels in accordance with the first power control command, and to transmit the second set of channels in accordance with the second power control command.

In another aspect, the disclosure provides a network node configured for wireless communication, which includes at least one processor, a memory coupled to the at least one processor, and a communications interface coupled to the at least one processor. Here, the at least one processor is configured to determine that a first cell in a radio network subsystem (RNS) corresponding to the network node is experiencing high interference from a user equipment (UE), and to instruct the first cell to transmit a power control command adapted to control a transmit power corresponding to one or more channels for control information corresponding to a received downlink transmission, independently of a transmit power corresponding to one or more channels for uplink data transmission.

In another aspect, the disclosure provides a computer readable medium operable at a wireless user equipment (UE), including instructions for causing a computer to receive a first power control command adapted to control a transmit power corresponding to a first set of channels, instructions for causing a computer to receive a second power control command adapted to control a transmit power corresponding to a second set of channels, instructions for causing a computer to transmit the first set of channels in accordance with the first power control command, and instructions for causing a computer to transmit the second set of channels in accordance with the second power control command.

In another aspect, the disclosure provides a computer readable medium operable at a network node, including instructions for causing a computer to determine that a first cell in a radio network subsystem (RNS) corresponding to the network node is experiencing high interference from a user equipment (UE), and instructions for causing a computer to instruct the first cell to transmit a power control command adapted to control a transmit power corresponding to one or more channels for control information corresponding to a received downlink transmission, independently of a transmit power corresponding to one or more channels for uplink data transmission.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Figure 1:
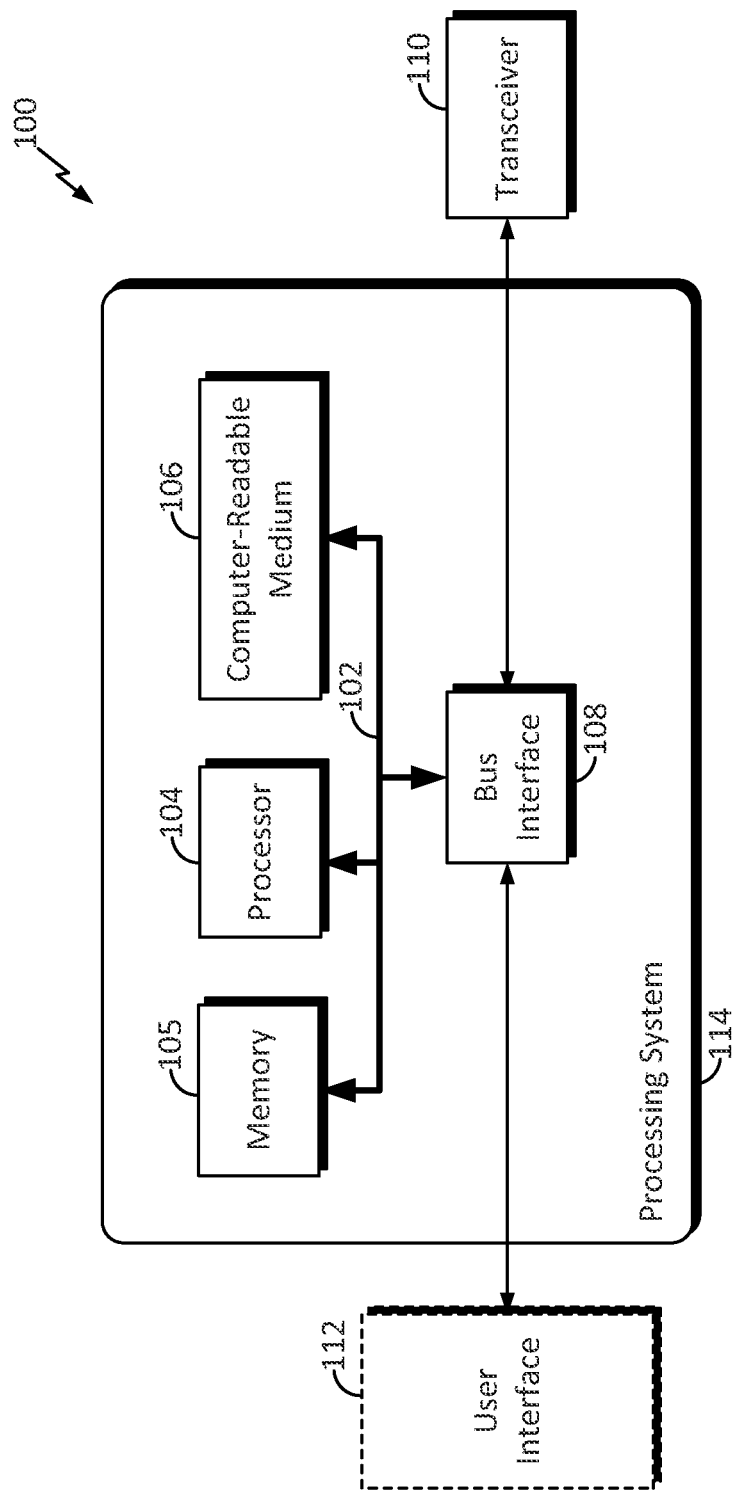
FIG. 1 is a block diagram illustrating an example of a hardware implementation for an apparatus employing a processing system.

FIG. 1 is a conceptual diagram illustrating an example of a hardware implementation for an apparatus 100 employing a processing system 114. In accordance with various aspects of the disclosure, an element, or any portion of an element, or any combination of elements may be implemented with a processing system 114 that includes one or more processors 104. For example, the apparatus 100 may be a user equipment (UE) as illustrated in any one or more of FIGS. 3, 4, 5, 6, 7, and/or 8. In another example, the apparatus 100 may be a radio network controller (RNC) as illustrated in any one or more of FIGS. 3 and/or 9. Examples of processors 104 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. That is, the processor 104, as utilized in an apparatus 100, may be used to implement any one or more of the processes described below and illustrated in FIGS. 10 and 11.

In this example, the processing system 114 may be implemented with a bus architecture, represented generally by the bus 102. The bus 102 may include any number of interconnecting buses and bridges depending on the specific application of the processing system 114 and the overall design constraints. The bus 102 links together various circuits including one or more processors (represented generally by the processor 104), a memory 105, and computer-readable media (represented generally by the computer-readable medium 106). The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a means for communicating with various other apparatus over a transmission medium. Depending upon the nature of the apparatus, a user interface 112 (e.g., keypad, display, speaker, microphone, joystick) may also be provided.

The processor 104 is responsible for managing the bus 102 and general processing, including the execution of software stored on the computer-readable medium 106. The software, when executed by the processor 104, causes the processing system 114 to perform the various functions described herein for any particular apparatus. The computer-readable medium 106 may also be used for storing data that is manipulated by the processor 104 when executing software.

One or more processors 104 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 106. The computer-readable medium 106 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 106 may reside in the processing system 114, external to the processing system 114, or distributed across multiple entities including the processing system 114. The computer-readable medium 106 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

Figure 2:
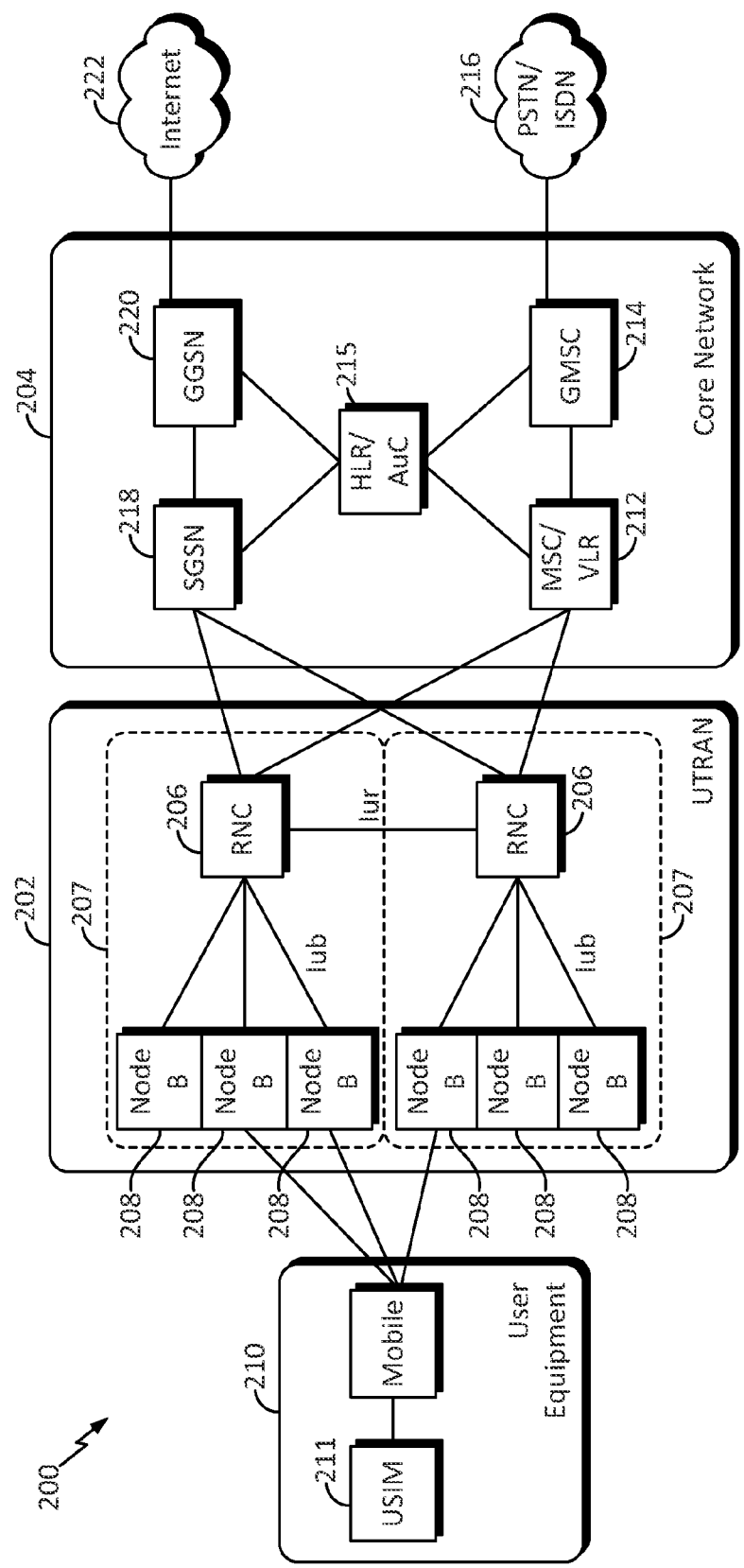
FIG. 2 is a block diagram conceptually illustrating an example of a telecommunications system.

The various concepts presented throughout this disclosure may be implemented across a broad variety of telecommunication systems, network architectures, and communication standards. Referring now to FIG. 2, as an illustrative example without limitation, various aspects of the present disclosure are illustrated with reference to a Universal Mobile Telecommunications System (UMTS) system 200. A UMTS network includes three interacting domains: a core network 204, a radio access network (RAN) (e.g., the UMTS Terrestrial Radio Access Network (UTRAN) 202), and a user equipment (UE) 210. Among several options available for a UTRAN 202, in this example, the illustrated UTRAN 202 may employ a W-CDMA air interface for enabling various wireless services including telephony, video, data, messaging, broadcasts, and/or other services. The UTRAN 202 may include a plurality of Radio Network Subsystems (RNSs) such as an RNS 207, each controlled by a respective Radio Network Controller (RNC) such as an RNC 206. Here, the UTRAN 202 may include any number of RNCs 206 and RNSs 207 in addition to the illustrated RNCs 206 and RNSs 207. The RNC 206 is an apparatus responsible for, among other things, assigning, reconfiguring, and releasing radio resources within the RNS 207. The RNC 206 may be interconnected to other RNCs (not shown) in the UTRAN 202 through various types of interfaces such as a direct physical connection, a virtual network, or the like using any suitable transport network.

The geographic region covered by the RNS 207 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 208 are shown in each RNS 207; however, the RNSs 207 may include any number of wireless Node Bs. The Node Bs 208 provide wireless access points to a core network 204 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as user equipment (UE) in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. In a UMTS system, the UE 210 may further include a universal subscriber identity module (USIM) 211, which contains a user's subscription information to a network. For illustrative purposes, one UE 210 is shown in communication with a number of the Node Bs 208. The downlink (DL), also called the forward link, refers to the communication link from a Node B 208 to a UE 210 and the uplink (UL), also called the reverse link, refers to the communication link from a UE 210 to a Node B 208.

The core network 204 can interface with one or more access networks, such as the UTRAN 202. As shown, the core network 204 is a UMTS core network. However, as those skilled in the art will recognize, the various concepts presented throughout this disclosure may be implemented in a RAN, or other suitable access network, to provide UEs with access to types of core networks other than UMTS networks.

The illustrated UMTS core network 204 includes a circuit-switched (CS) domain and a packet-switched (PS) domain. Some of the circuit-switched elements are a Mobile services Switching Centre (MSC), a Visitor Location Register (VLR), and a Gateway MSC (GMSC). Packet-switched elements include a Serving GPRS Support Node (SGSN) and a Gateway GPRS Support Node (GGSN). Some network elements, like EIR, HLR, VLR, and AuC may be shared by both of the circuit-switched and packet-switched domains.

In the illustrated example, the core network 204 supports circuit-switched services with a MSC 212 and a GMSC 214. In some applications, the GMSC 214 may be referred to as a media gateway (MGW). One or more RNCs, such as the RNC 206, may be connected to the MSC 212. The MSC 212 is an apparatus that controls call setup, call routing, and UE mobility functions. The MSC 212 also includes a visitor location register (VLR) that contains subscriber-related information for the duration that a UE is in the coverage area of the MSC 212. The GMSC 214 provides a gateway through the MSC 212 for the UE to access a circuit-switched network 216. The GMSC 214 includes a home location register (HLR) 215 containing subscriber data, such as the data reflecting the details of the services to which a particular user has subscribed. The HLR is also associated with an authentication center (AuC) that contains subscriber-specific authentication data. When a call is received for a particular UE, the GMSC 214 queries the HLR 215 to determine the UE's location and forwards the call to the particular MSC serving that location.

The illustrated core network 204 also supports packet-switched data services with a serving GPRS support node (SGSN) 218 and a gateway GPRS support node (GGSN) 220. General Packet Radio Service (GPRS) is designed to provide packet-data services at speeds higher than those available with standard circuit-switched data services. The GGSN 220 provides a connection for the UTRAN 202 to a packet-based network 222. The packet-based network 222 may be the Internet, a private data network, or some other suitable packet-based network. The primary function of the GGSN 220 is to provide the UEs 210 with packet-based network connectivity. Data packets may be transferred between the GGSN 220 and the UEs 210 through the SGSN 218, which performs primarily the same functions in the packet-based domain as the MSC 212 performs in the circuit-switched domain.

Figure 3:
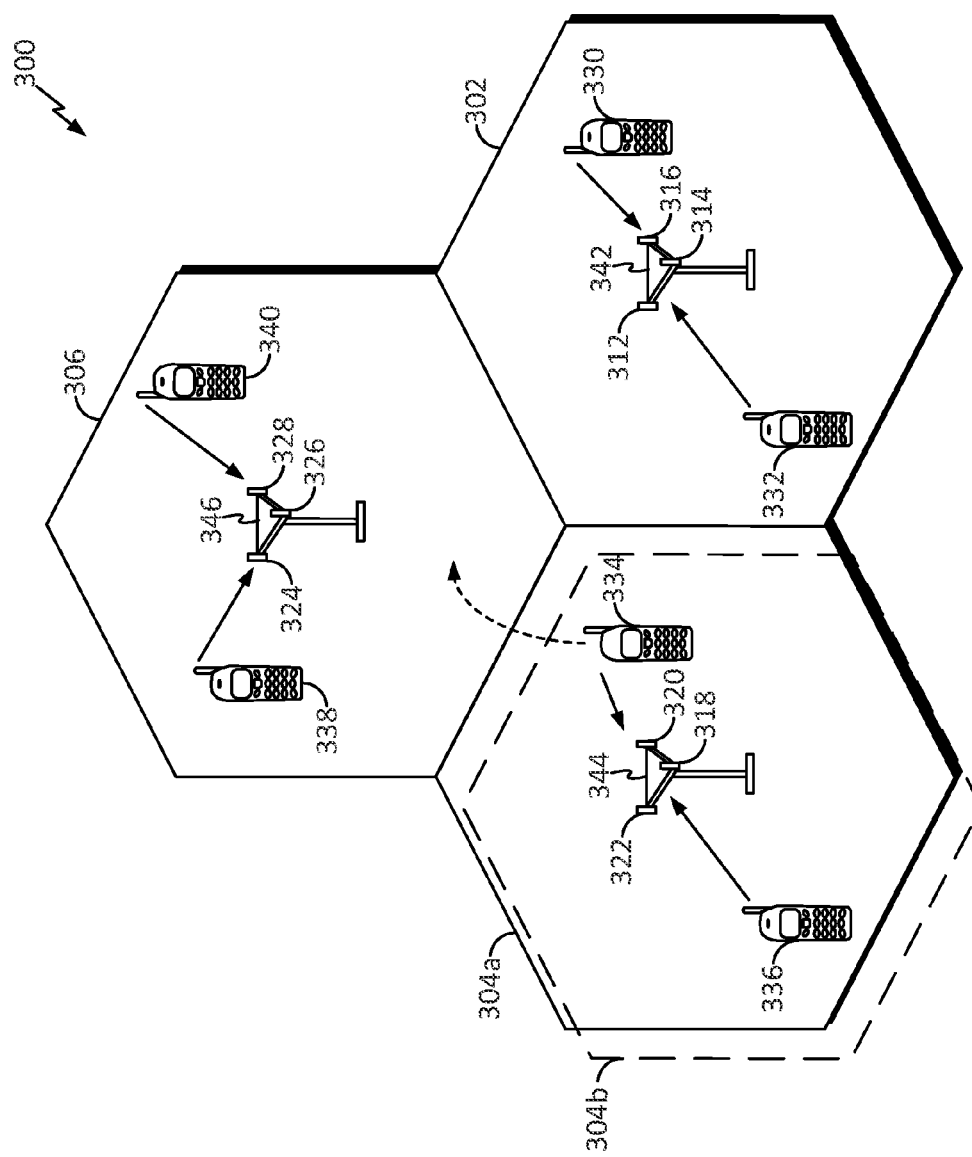
FIG. 3 is a conceptual diagram illustrating an example of an access network.

The UTRAN 202 is one example of a RAN that may be utilized in accordance with the present disclosure. Referring to FIG. 3, by way of example and without limitation, a simplified schematic illustration of a RAN 300 in a UTRAN architecture is illustrated. The system includes multiple cellular regions (cells), including cells 302, 304, and 306, each of which may include one or more sectors. Cells may be defined geographically (e.g., by coverage area) and/or may be defined in accordance with a frequency, scrambling code, etc. That is, the illustrated geographically-defined cells 302, 304, and 306 may each be further divided into a plurality of cells, e.g., by utilizing different scrambling codes. For example, cell 304*a* may utilize a first scrambling code, and cell 304*b*, while in the same geographic region and served by the same Node B 344, may be distinguished by utilizing a second scrambling code.

In a cell that is divided into sectors, the multiple sectors within a cell can be formed by groups of antennas with each antenna responsible for communication with UEs in a portion of the cell. For example, in cell 302, antenna groups 312, 314, and 316 may each correspond to a different sector. In cell 304, antenna groups 318, 320, and 322 may each correspond to a different sector. In cell 306, antenna groups 324, 326, and 328 may each correspond to a different sector.

The cells 302, 304, and 306 may include several UEs that may be in communication with one or more sectors of each cell 302, 304, or 306. For example, UEs 330 and 332 may be in communication with Node B 342, UEs 334 and 336 may be in communication with Node B 344, and UEs 338 and 340 may be in communication with Node B 346. Here, each Node B 342, 344, and 346 may be configured to provide an access point to a core network 204 (see FIG. 2) for all the UEs 330, 332, 334, 336, 338, and 340 in the respective cells 302, 304, and 306.

During a call with a source cell, or at any other time, the UE 336 may monitor various parameters of its source cell as well as various parameters of neighboring cells. Further, depending on the quality of these parameters, the UE 336 may maintain communication with one or more of the neighboring cells. During this time, the UE 336 may maintain an Active Set, that is, a list of cells to which the UE 336 is simultaneously connected (i.e., the UTRAN cells that are currently assigning a downlink dedicated physical channel DPCH or fractional downlink dedicated physical channel F-DPCH to the UE 336 may constitute the Active Set).

The UTRAN air interface may be a spread spectrum Direct-Sequence Code Division Multiple Access (DS-CDMA) system, such as one utilizing the W-CDMA standards. The spread spectrum DS-CDMA spreads user data through multiplication by a sequence of pseudorandom bits called chips. The W-CDMA air interface for the UTRAN 202 is based on such DS-CDMA technology and additionally calls for a frequency division duplexing (FDD). FDD uses a different carrier frequency for the uplink (UL) and downlink (DL) between a Node B 208 and a UE 210. Another air interface for UMTS that utilizes DS-CDMA, and uses time division duplexing (TDD), is the TD-SCDMA air interface. Those skilled in the art will recognize that although various examples described herein may refer to a W-CDMA air interface, the underlying principles are equally applicable to a TD-SCDMA air interface or any other suitable air interface.

Figure 4:
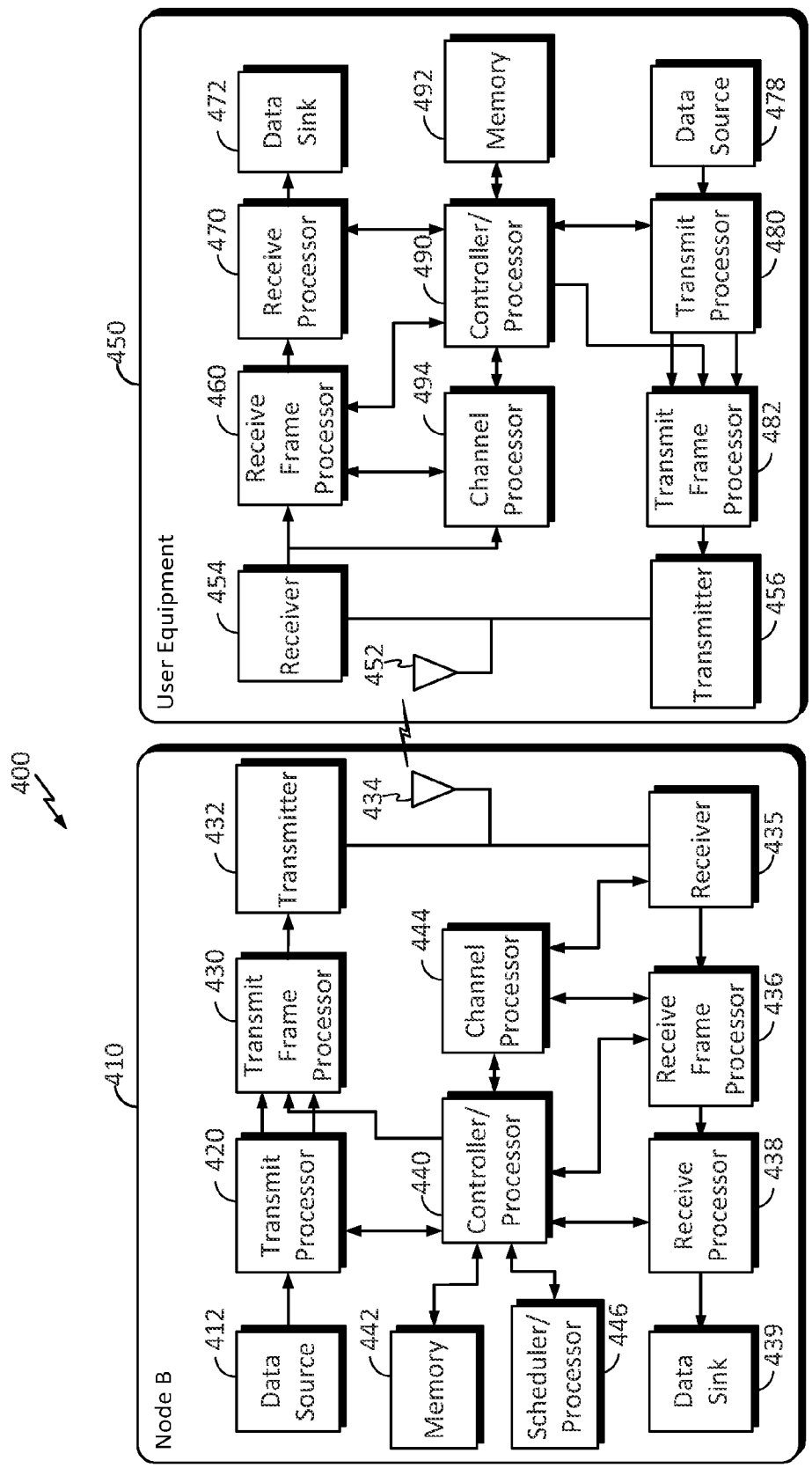
FIG. 4 is a block diagram conceptually illustrating an example of a Node B in communication with a UE in a telecommunications system.

FIG. 4 is a block diagram of an exemplary Node B 410 in communication with an exemplary UE 450 utilizing the W-CDMA air interface, where the Node B 410 may be the Node B 208 in FIG. 2, and the UE 450 may be the UE 210 in FIG. 2. In the downlink communication, a transmit processor 420 may receive data from a data source 412 and control signals from a controller/processor 440. The transmit processor 420 provides various signal processing functions for the data and control signals, as well as reference signals (e.g., pilot signals). For example, the transmit processor 420 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 444 may be used by a controller/processor 440 to determine the coding, modulation, spreading, and/or scrambling schemes for the transmit processor 420. These channel estimates may be derived from a reference signal transmitted by the UE 450 or from feedback from the UE 450. The symbols generated by the transmit processor 420 are provided to a transmit frame processor 430 to create a frame structure. The transmit frame processor 430 creates this frame structure by multiplexing the symbols with information from the controller/processor 440, resulting in a series of frames. The frames are then provided to a transmitter 432, which provides various signal conditioning functions including amplifying, filtering, and modulating the frames onto a carrier for downlink transmission over the wireless medium through antenna 434. The antenna 434 may include one or more antennas, for example, including beam steering bidirectional adaptive antenna arrays or other similar beam technologies.

At the UE 450, a receiver 454 receives the downlink transmission through an antenna 452 and processes the transmission to recover the information modulated onto the carrier. The information recovered by the receiver 454 is provided to a receive frame processor 460, which parses each frame, and provides information from the frames to a channel processor 494 and the data, control, and reference signals to a receive processor 470. The receive processor 470 then performs the inverse of the processing performed by the transmit processor 420 in the Node B 410. More specifically, the receive processor 470 descrambles and despreads the symbols, and then determines the most likely signal constellation points transmitted by the Node B 410 based on the modulation scheme. These soft decisions may be based on channel estimates computed by the channel processor 494. The soft decisions are then decoded and deinterleaved to recover the data, control, and reference signals. The CRC codes are then checked to determine whether the frames were successfully decoded. The data carried by the successfully decoded frames will then be provided to a data sink 472, which represents applications running in the UE 450 and/or various user interfaces (e.g., display). Control signals carried by successfully decoded frames will be provided to a controller/processor 490. When frames are unsuccessfully decoded by the receiver processor 470, the controller/processor 490 may also use an acknowledgement (ACK) and/or negative acknowledgement (NACK) protocol to support retransmission requests for those frames.

In the uplink, data from a data source 478 and control signals from the controller/processor 490 are provided to a transmit processor 480. The data source 478 may represent applications running in the UE 450 and various user interfaces (e.g., keyboard). Similar to the functionality described in connection with the downlink transmission by the Node B 410, the transmit processor 480 provides various signal processing functions including CRC codes, coding and interleaving to facilitate FEC, mapping to signal constellations, spreading with OVSFs, and scrambling to produce a series of symbols. Channel estimates, derived by the channel processor 494 from a reference signal transmitted by the Node B 410 or from feedback contained in the midamble transmitted by the Node B 410, may be used to select the appropriate coding, modulation, spreading, and/or scrambling schemes. The symbols produced by the transmit processor 480 will be provided to a transmit frame processor 482 to create a frame structure. The transmit frame processor 482 creates this frame structure by multiplexing the symbols with information from the controller/processor 490, resulting in a series of frames. The frames are then provided to a transmitter 456, which provides various signal conditioning functions including amplification, filtering, and modulating the frames onto a carrier for uplink transmission over the wireless medium through the antenna 452.

The uplink transmission is processed at the Node B 410 in a manner similar to that described in connection with the receiver function at the UE 450. A receiver 435 receives the uplink transmission through the antenna 434 and processes the transmission to recover the information modulated onto the carrier. The information recovered by the receiver 435 is provided to a receive frame processor 436, which parses each frame, and provides information from the frames to the channel processor 444 and the data, control, and reference signals to a receive processor 438. The receive processor 438 performs the inverse of the processing performed by the transmit processor 480 in the UE 450. The data and control signals carried by the successfully decoded frames may then be provided to a data sink 439 and the controller/processor, respectively. If some of the frames were unsuccessfully decoded by the receive processor 438, the controller/processor 440 may also use an acknowledgement (ACK) and/or negative acknowledgement (NACK) protocol to support retransmission requests for those frames.

The controller/processors 440 and 490 may be used to direct the operation at the Node B 410 and the UE 450, respectively. For example, the controller/processors 440 and 490 may provide various functions including timing, peripheral interfaces, voltage regulation, power management, and other control functions. The computer readable media of memories 442 and 492 may store data and software for the Node B 410 and the UE 450, respectively. A scheduler/processor 446 at the Node B 410 may be used to allocate resources to the UEs and schedule downlink and/or uplink transmissions for the UEs.

A high speed packet access (HSPA) air interface includes a series of enhancements to the 3G/W-CDMA air interface between the UE 450 and the Node B 410, facilitating greater throughput and reduced latency for users. Among other modifications over prior standards, HSPA utilizes hybrid automatic repeat request (HARQ), shared channel transmission, and adaptive modulation and coding. The standards that define HSPA include HSDPA (high speed downlink packet access) and HSUPA (high speed uplink packet access, also referred to as enhanced uplink or EUL).

For example, in Release 5 of the 3GPP family of standards, HSDPA was introduced. HSDPA utilizes as its transport channel the high-speed downlink shared channel (HS-DSCH), which may be shared by several UEs. The HS-DSCH is implemented by three physical channels: the high-speed physical downlink shared channel (HS-PDSCH), the high-speed shared control channel (HS-SCCH), and the high-speed dedicated physical control channel (HS-DPCCH).

The HS-SCCH is a physical channel that may be utilized to carry downlink control information related to the transmission of HS-DSCH. Here, the HS-DSCH may be associated with one or more HS-SCCH. The UE may continuously monitor the HS-SCCH to determine when to read its data from the HS-DSCH and to determine the modulation scheme used on the assigned physical channel.

The HS-PDSCH is a physical channel that may be shared by several UEs and may carry downlink data for the high-speed downlink. The HS-PDSCH may support quadrature phase shift keying (QPSK), 16-quadrature amplitude modulation (16-QAM), and multi-code transmission.

The HS-DPCCH is an uplink physical channel that may carry feedback from the UE to assist the Node B in its scheduling algorithm. The feedback may include a channel quality indicator (CQI) and a positive or negative acknowledgement (ACK/NAK) of a previous HS-DSCH transmission.

The above-described channels (HS-PDSCH, HS-SCCH, and HS-DPCCH) in the HSDPA network are transmitted in addition to those corresponding to the release-99 dedicated channel (DCH). The DCH is a transport channel mapped to physical channels including the dedicated physical data channel (DPDCH), which carries information such as user data, and the dedicated physical control channel (DPCCH), a pilot channel that carries control information associated with the DPDCH. Each of the DPDCH and the DPCCH are utilized on both the uplink and the downlink.

3GPP Release 6 specifications introduced uplink enhancements referred to as Enhanced Uplink (EUL) or High Speed Uplink Packet Access (HSUPA). HSUPA utilizes as its transport channel the EUL Dedicated Channel (E-DCH). The E-DCH is transmitted in the uplink together with the Release 99 DCH. The control portion of the DCH, that is, the DPCCH, carries pilot bits and downlink power control commands on uplink transmissions. In the present disclosure, the DPCCH may be referred to as a control channel (e.g., a primary control channel) or a pilot channel (e.g., a primary pilot channel) in accordance with whether reference is being made to the channel's control aspects or its pilot aspects.

The E-DCH is implemented by physical channels including the E-DCH Dedicated Physical Data Channel (E-DPDCH) and the E-DCH Dedicated Physical Control Channel (E-DPCCH). In addition, HSUPA relies on additional physical channels including the E-DCH HARQ Indicator Channel (E-HICH), the E-DCH Absolute Grant Channel (E-AGCH), and the E-DCH Relative Grant Channel (E-RGCH).

In a 3GPP UMTS system, the signaling protocol stack is divided into a Non-Access Stratum (NAS) and an Access Stratum (AS). The NAS provides the upper layers, for signaling between the UE 210 and the core network 204 (referring to FIG. 2), and may include circuit switched and packet switched protocols. The AS provides the lower layers, for signaling between the UTRAN 202 and the UE 210, and may include a user plane and a control plane. Here, the user plane or data plane carries user traffic, while the control plane carries control information (i.e., signaling).

Figure 5:
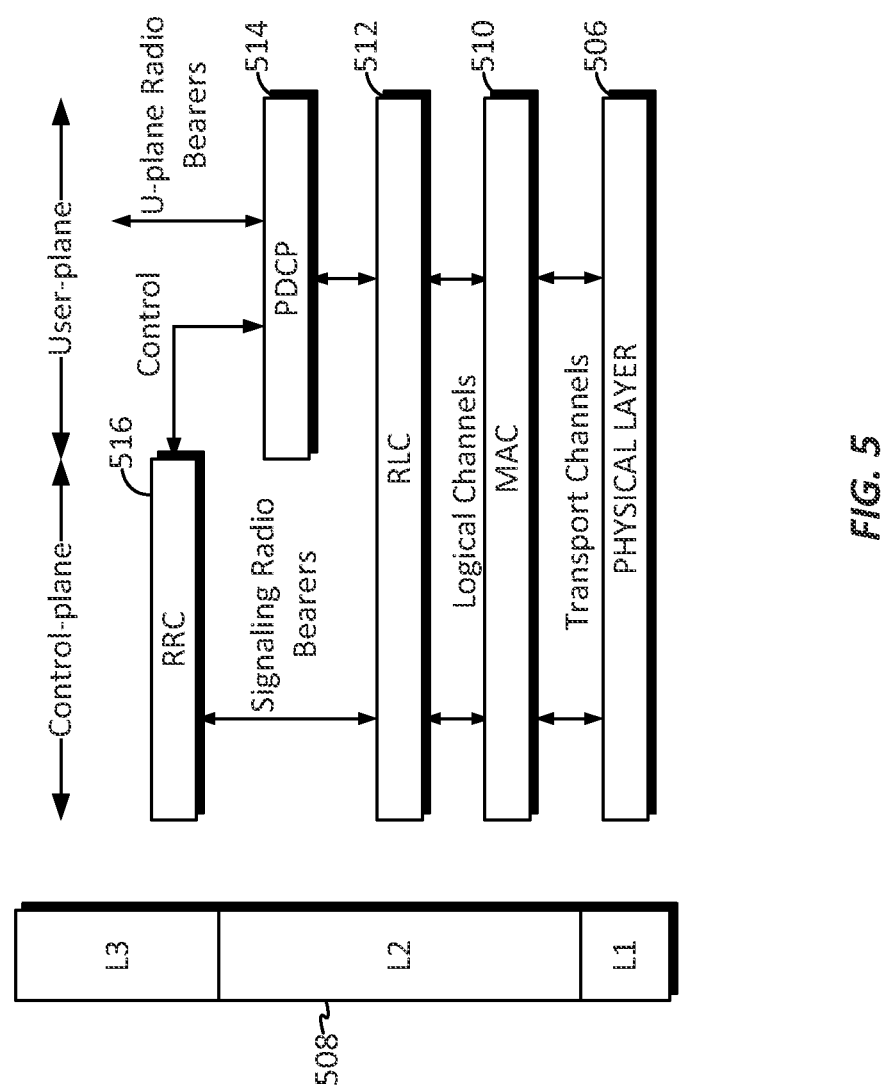
FIG. 5 is a conceptual diagram illustrating an example of a radio protocol architecture for the user and control plane.

Turning to FIG. 5, the AS is shown with three layers: Layer 1, Layer 2, and Layer 3. Layer 1 is the lowest layer and implements various physical layer signal processing functions. Layer 1 will be referred to herein as the physical layer 506. The data link layer, called Layer 2 508, is above the physical layer 506 and is responsible for the link between the UE 210 and Node B 208 over the physical layer 506.

At Layer 3, the RRC layer 516 handles the control plane signaling between the UE 210 and the Node B 208. RRC layer 516 includes a number of functional entities for routing higher layer messages, handling broadcasting and paging functions, establishing and configuring radio bearers, etc.

In the illustrated air interface, the L2 layer 508 is split into sublayers. In the control plane, the L2 layer 508 includes two sublayers: a medium access control (MAC) sublayer 510 and a radio link control (RLC) sublayer 512. In the user plane, the L2 layer 508 additionally includes a packet data convergence protocol (PDCP) sublayer 514. Although not shown, the UE may have several upper layers above the L2 layer 508 including a network layer (e.g., IP layer) that is terminated at a PDN gateway on the network side and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between Node Bs.

The RLC sublayer 512 generally supports an acknowledged mode (AM) (where an acknowledgment and retransmission process may be used for error correction), an unacknowledged mode (UM), and a transparent mode for data transfers, and provides segmentation and reassembly of upper layer data packets and reordering of data packets to compensate for out-of-order reception due to a hybrid automatic repeat request (HARQ) at the MAC layer. In the acknowledged mode, RLC peer entities such as an RNC and a UE may exchange various RLC protocol data units (PDUs) including RLC Data PDUs, RLC Status PDUs, and RLC Reset PDUs, among others. In the present disclosure, the term "packet" may refer to any RLC PDU exchanged between RLC peer entities.

The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

One aspect of many wireless communication networks is power control of uplink transmission power. In the UMTS network 200 utilizing a W-CDMA air interface, an inner loop power control and an outer loop power control work together to manage the uplink transmission power for UEs 210 throughout the network. Inner loop power control, also frequently referred to as fast power control, includes the determination of a signal-to-interference ratio (SIR) at a Node B 208. Here, if the determined SIR is below a target SIR, the Node B may transmit a power control command to the UEs that have that Node B in their Active Set, requesting those UEs to reduce their transmission power. Outer loop power control includes the determination of uplink transmission quality at the RNC 206, and based on the determined quality, the target SIR (used by inner loop power control) is sent to the Node Bs 208. Thus, the target SIR can go up and down over time, in accordance with one or more characteristics of the uplink quality, e.g., the uplink packet error rates.

In any wireless communication network, such as the UMTS network illustrated in FIG. 2 and its corresponding radio access network illustrated in FIG. 3, the deployment of a variety of types of base stations can be such that the network is called a heterogeneous network. A heterogeneous network may include conventional high-power base stations, sometimes called macrocells, as well as various low-power base stations such as microcells, picocells, and femtocells, with varying capacities, coverage areas, and power capabilities.

In a heterogeneous network where different base stations have different power levels, even with conventional uplink power control, as described above, a number of issues can arise relating to interference between the different base stations, or between user equipment served by one or the other type of base station. Additionally, due to the varying power capabilities of the different types of base stations, when one base station sends a power control "DOWN" command to a UE, e.g., to reduce interference from that UE's uplink transmissions, this can adversely affect reception of those transmissions by the UE's serving cell.

Figure 6:
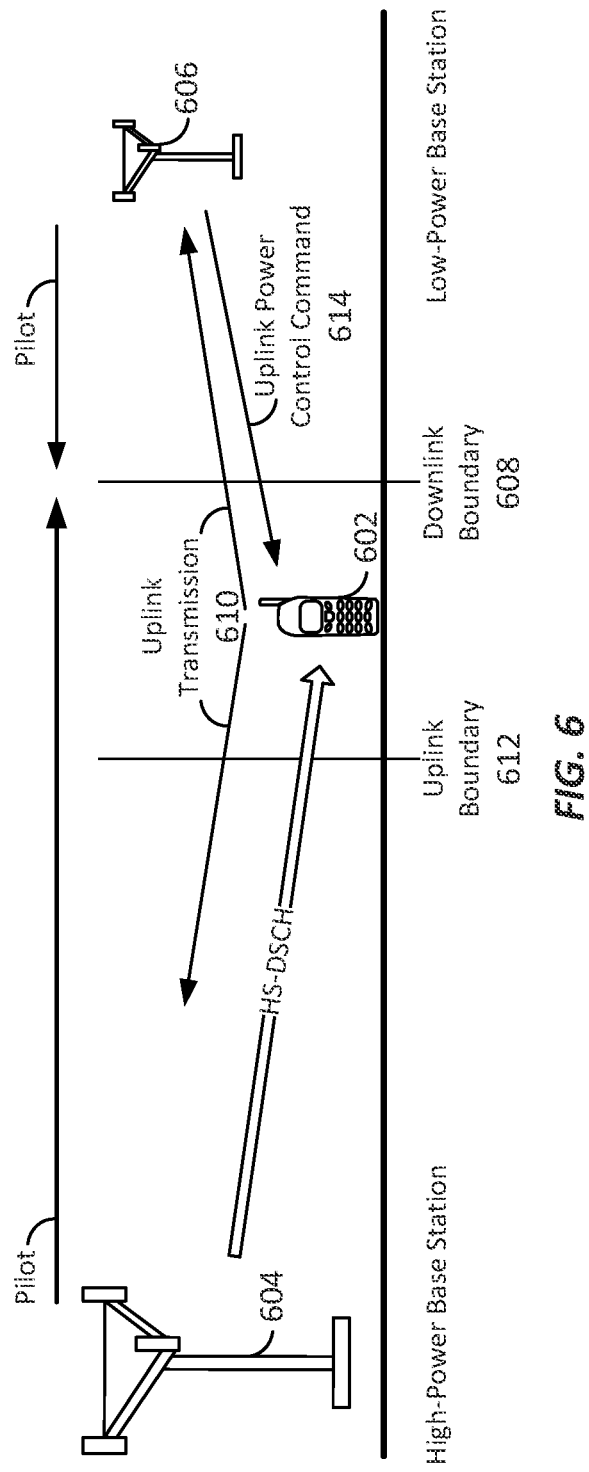
FIG. 6 is a conceptual diagram illustrating a portion of an exemplary heterogeneous network according to one example.

FIG. 6 is a simplified schematic diagram of part of a heterogeneous network to illustrate a certain uplink imbalance that can result in the failure of a UE's serving cell 604 (i.e., the cell providing the HS-DSCH to the UE) to decode the HS-DPCCH (i.e., the uplink control channel transmitted by the UE 602, which includes feedback relating to the HS-DSCH transmissions as described above). In this illustration, a high-power Node B (e.g. a macrocell) 604 is illustrated at the left, and a low-power Node B (e.g., a picocell) 606 is illustrated at the right. The low-power Node B 606 can be any one of several examples of low-power base stations. For example, a femtocell, sometimes called a home Node B in 3GPP standards, is a small base station or Node B typically configured for use in a home or office. A femtocell may typically utilize a high-speed Internet connection, such as a cable or DSL connection for its backhaul connection to the core network. A picocell (or microcell) is a relatively small and low-cost base station typically deployed to extend coverage from that available from a macrocell deployment, e.g., into buildings, malls, train stations, etc., where coverage from macrocells may otherwise be lacking.

As illustrated, each of the high-power Node B 604 and the low-power Node B 606 transmits a pilot signal over their respective service areas. Because the high-power Node B 604 at the left transmits its downlink at a higher power than that of the low-power Node B 606, a downlink boundary 608, where the power level received by a UE is the same for each of the base stations, is closer to the low-power Node B 606 than the high-power Node B 604. Thus, because the serving HS-DSCH cell for the UE 602 is based upon the strength of the received pilot channel (CPICH) from each cell, a region where the UE 602 would select the high-power Node B 604 as its serving HS-DSCH cell is larger than a region where that UE 602 would select the low-power Node B 606 as its serving HS-DSCH cell. Here, it is seen that the DL boundary is closer to the low-power node than it is to the high-power node. That is, in this illustration if the UE 602 is positioned to the left of the downlink boundary 608, then the high-power Node B 604 would be selected as the serving HS-DSCH cell, and if the UE 602 is positioned to the right of the downlink boundary 608, then the low-power Node B 606 would be selected as the serving HS-DSCH cell.

On the other hand, for uplink (UL) transmissions 610 coming from the UE 602, including the HS-DPCCH feedback from the UE as well as E-DCH transmissions, the power of the received signal from the UE at any node, including both the high-power Node B 604 at the left and the low-power Node B 606 at the right, is basically proportional to the distance between the UE 602 and the respective receiving node. Thus, as seen in the illustration, the uplink boundary 612 is approximately halfway between the low-power Node B 606 and the high-power Node B 604.

In the illustration, the UE 602 is positioned between the downlink boundary 608 and the uplink boundary 612. In this region, because the UE 602 is to the left of the downlink boundary 608, it is served by the high-power Node B 604 at the left. That is, the HS-DSCH, which carries high-speed downlink transmissions for HSDPA, is provided from the high-power Node B 604. However, because the UE 602 is to the right of the uplink boundary 612, the low-power Node B 606 at the right receives a higher uplink signal strength from the UE.

Here, because the uplink transmission 610 may act as noise at non-serving cells (e.g., the low-power Node B 606), this transmission may decrease the SIR at the low-power Node B 606. In some scenarios, e.g., if the uplink signal strength of the uplink transmission 610 causes the SIR detected at the low-power Node B 606 to be higher than an SIR threshold, the low-power Node B 606 may in response transmit an uplink power control command 614, requesting the UE 602 to reduce its transmit power.

In some cases, especially if the UE 602 is relatively far away from its serving cell (i.e., the high-power Node B 604), or if its serving cell is experiencing high interference, or for any other reason such as the low-power Node B 606 reducing the transmit power of the UE 602 because of interference to the low power Node B 606 through power control commands, it may be possible that a reduction in the uplink transmit power from the UE 602 may cause errors or packet losses for those packets received by the high-power Node B 604. In particular, for feedback from the UE 602 that relates to the HS-DSCH transmission (i.e., the HS-DPCCH, which carries the CQI and HARQ ACK/NACK information), which is only received and decoded by the serving cell, loss of these packets at the high-power Node B 604 can result in unnecessary retransmissions of downlink packets, or even loss of the high-speed downlink. Moreover, if the power of the E-DCH transmissions from the UE 602 is too low for reliable decoding at the serving cell, uplink data transmissions can equally suffer.

Thus, when utilizing conventional uplink power control, the UE 602 in this region can encounter an uplink imbalance: the low-power Node B 606 at the right may power control the UE 602 to mitigate interference from what it perceives to be high-power transmissions, which can result in a failure of the high-power Node B 604 at the left to decode the uplink transmissions from the UE.

Therefore, there is a desire in the field for an effective way to control the uplink transmit power at UEs in this overlapping region, such that the uplink transmissions (e.g., the HS-DPCCH) are reliably decoded at the serving cell (e.g., high power Node B 604), without substantially increasing interference at a non-serving cell (e.g., the low-power Node B 606).

One straightforward approach might be to turn off, or disable, the power control procedure from the low-power Node B 606. Thus, the UE 602 would solely listen to power control commands from the high-power Node B 604, ensuring that the uplink HS-DPCCH and the E-DCH would be reliably decoded at the high-power Node B 604. However, this approach would cause all uplink channels from the UE 602 to be at substantially higher power at the low-power Node B 606, increasing undesirable interference to other users in that cell. Thus, the uplink capacity at the low-power Node B 606 would suffer.

Therefore, in accordance with an aspect of the present disclosure, power control for a first set of channels may be separated from power control for a second set of channels. That is, a first power control command may be transmitted to the UE to control the power the UE uses for a first set of channels, e.g., the uplink data channels such as one or more of the E-DCH and/or the DPDCH; and a second power control command may be transmitted to the UE to control a power the UE uses for a second set of channels, e.g., uplink control channels such as the HS-DPCCH. In various examples, different sets of channels may be utilized in the first set and the second set. In one particular example, the first power control command may be utilized to control the power of the UE's data channel transmissions, and the second power control command may be utilized to control the power of the UE's HS-DPCCH transmission.

The uplink data channel transmissions from the UE generally enjoy selective combining at a plurality of base stations during soft handover. Thus, allowing power control of these soft-combined channels at a non-serving cell, such as the low-power Node B, may not be problematic, since the lower power transmission may continue to be properly received and decoded at the nearest cell, even if the nearest cell is not the serving cell. However, the HS-DPCCH transmission from the UE is only received and decoded at the serving HS-DSCH cell. Therefore, in accordance with an aspect of the present disclosure, the power control of the HS-DPCCH may be decoupled from that of other channels. In this way, the serving HS-DSCH cell may be enabled to improve its likelihood of successfully receiving this information without power control commands from other cells reducing the power so much that this information is no longer received.

Moreover, by decoupling the power control of the high-speed uplink (HSUPA) transmissions, such as those associated with the E-DCH, the low-power Node B, which may not be the serving cell for the UE described above, may still be enabled to control the SNR within its service area by reducing the transmit power of nearby UEs.

Here, the low-power Node B may still experience some interference from the uplink HS-DPCCH transmission from the UE, which as described above is not power-controlled by the low-power Node B. However, the HS-DPCCH transmissions are generally very brief in duration, for example only including a few bits of data. Thus, allowing increased power on these HS-DPCCH transmissions does not necessarily substantially increase interference at the non-serving cells.

In this way, by separating the power control for the two types of channels, interference at the neighbor cell (e.g., the low-power node at the right of FIG. 6 can be reduced. Moreover, by enabling the power of uplink data transmissions to be reduced, while the uplink control channels are maintained at a relatively higher power, power consumption at the UE may be reduced, extending battery life.

Figure 7:
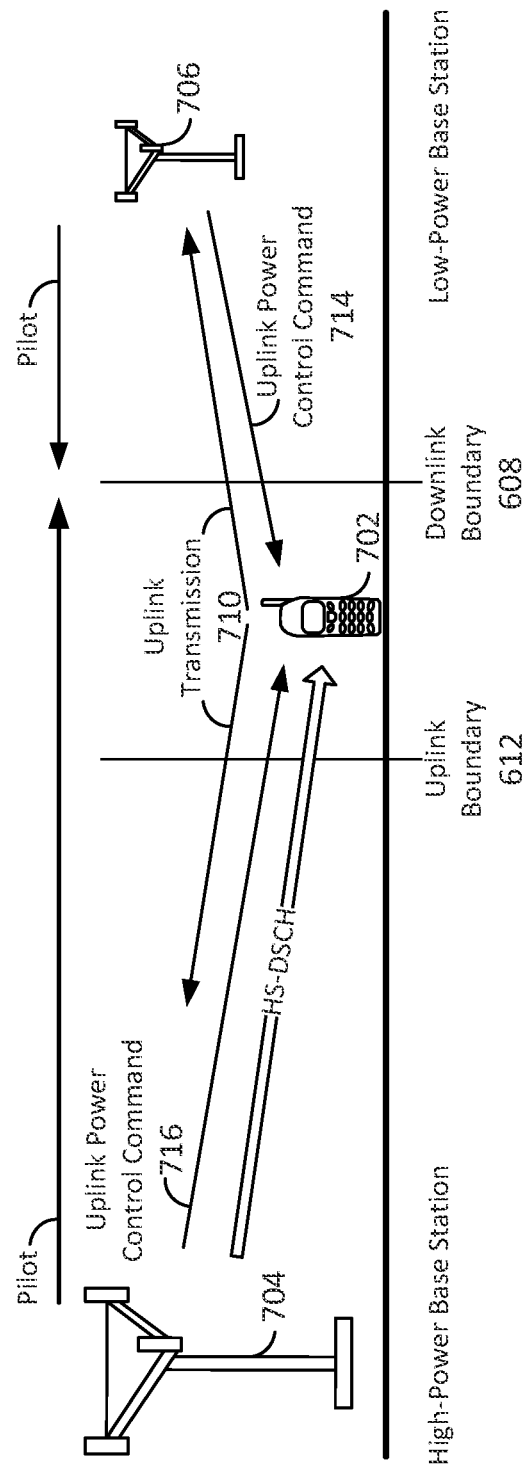
FIG. 7 is a conceptual diagram illustrating a UE receiving independent power control commands from different cells in a heterogeneous network according to one example.

FIG. 7 is an illustration a heterogeneous network similar to the network shown in FIG. 6, however, the network illustrated in FIG. 7 is configured according to one or more aspects of the present disclosure. Here, in accordance with one example, a first power control command 716 transmitted by a high-power Node B 704, at the left, may be utilized by a UE 702 to control the power of the HS-DPCCH transmission by the UE. That is, because the high-power Node B 704 at the left is the serving HS-DSCH cell, this node transmits the HS-DSCH downlink data to the UE 702. As described above, the HS-DPCCH includes control information corresponding to this HS downlink data, such as the CQI and HARQ ACK/NACK messages.

Further, a second power control command 714 may be transmitted by the low-power Node B 706, at the right. This second power control command may be utilized by the UE 702 to control the power of uplink data transmissions by the UE, in particular, relating to the EUL transmissions (e.g., the E-DCH), and optionally, R-99 uplink transmissions on the DPDCH. That is, because the UE 702 may be in soft handover, such that more than one base station, including the nearby low-power Node B 706, may receive and decode such uplink data transmissions, power control of these transmissions by the low-power Node B 706 is appropriate and can act to effectively reduce the interference at the low-power Node B 706 caused by these transmissions.

In accordance with an aspect of the disclosure, the first power control command 716, transmitted by the high-power Node B 704 toward the left, may result in a relatively high-power transmission by the UE 702 of the HS-DPCCH feedback information; and the second power control command 714, transmitted by the low-power Node B 706 toward the right, may result in a relatively low-power transmission by the UE 702 of the uplink data transmission. That is, because the HS-DPCCH transmission is relatively short, generally including only a few bits of information, its relatively high-power transmission would not cause substantial interference to other cells such as the one corresponding to the low-power Node B 706 toward the right. Further, its relatively high-power transmission can enable reliable reception and decoding of its contained information at the more distant high-power Node B 704 toward the left.

In a further aspect of the present disclosure, the second power control command 714, transmitted by the low-power Node B 706 toward the right, may utilize any one or more of a variety of power control mechanisms. As one example, the second power control command 714 may operate to increase or decrease the traffic to pilot (t2p) power ratio utilized by the UE 702 for transmission of the E-DPDCH channel. That is, the power of the E-DPDCH transmissions is generally determined at the UE 702 by a power ratio, the t2p ratio, relative to the power of a pilot transmission (e.g., the DPCCH). Thus, transmitting a power control command corresponding to a new t2p ratio can control the power of the E-DPDCH transmissions by the UE 702.

In another example, the second power control command 714, transmitted by the low-power Node B 706 toward the right, may operate to increase or decrease the transport block size (TBS) on the E-DPDCH channel. That is, data transmissions on the E-DPDCH are generally divided into transport blocks, each having a certain transport block size. Transport blocks are transmitted once each transmission time interval (TTI). Here, transmitting a power control command corresponding to a new TBS can affect the power of the E-DPDCH transmissions, by causing more or less data to be transmitted each TTI. That is, by increasing the TBS, the data rate for uplink transmissions can be increased, and because the low-power Node B 706 is receiving the E-DPDCH transmission from the UE 702 in soft handover, the data at the higher rate can be successfully received and decoded without requiring the UE 702 to increase its transmit power.

In some examples, a change to the t2p ratio (i.e., an increase or a decrease in the E-DPDCH power) may be requested while keeping the TBS the same; and in other examples, a change to the TBS (i.e., an increase or a decrease in the E-DPDCH data rate) may be requested while keeping the t2p ratio the same. Of course, some combination between the two, such as a change in both the t2p ratio and the TBS, may be utilized as well within the scope of the present disclosure.

In some aspects of the disclosure, the power to utilize for E-DPCCH transmissions on the uplink (i.e., the uplink control channel associated with the E-DCH) may be controlled by utilizing the E-DPDCH power control mechanism, described above. That is, with reference once again to FIG. 7, the second power control command 714 transmitted from the non-serving cell (i.e., the low-power Node B 706) may control the power not only of the E-DPDCH, but may also control the power of the E-DPCCH associated with the E-DPDCH.

In a further aspect of the disclosure, the above described procedure for power control of the UE 702 by the low-power Node B 706 may also be accomplished in principle, without requiring the low-power Node B 706 to transmit explicit power control commands for the E-DCH channels (i.e., the E-DPDCH and/or the E-DPCCH). In this case, the low-power Node B 706 can configure a target block error rate (BLER) at the UE 702, and UE accordingly may autonomously increase/decrease t2p ratio or the TBS to maintain the BLER indicated by the low-power Node B 706.

Figure 8:
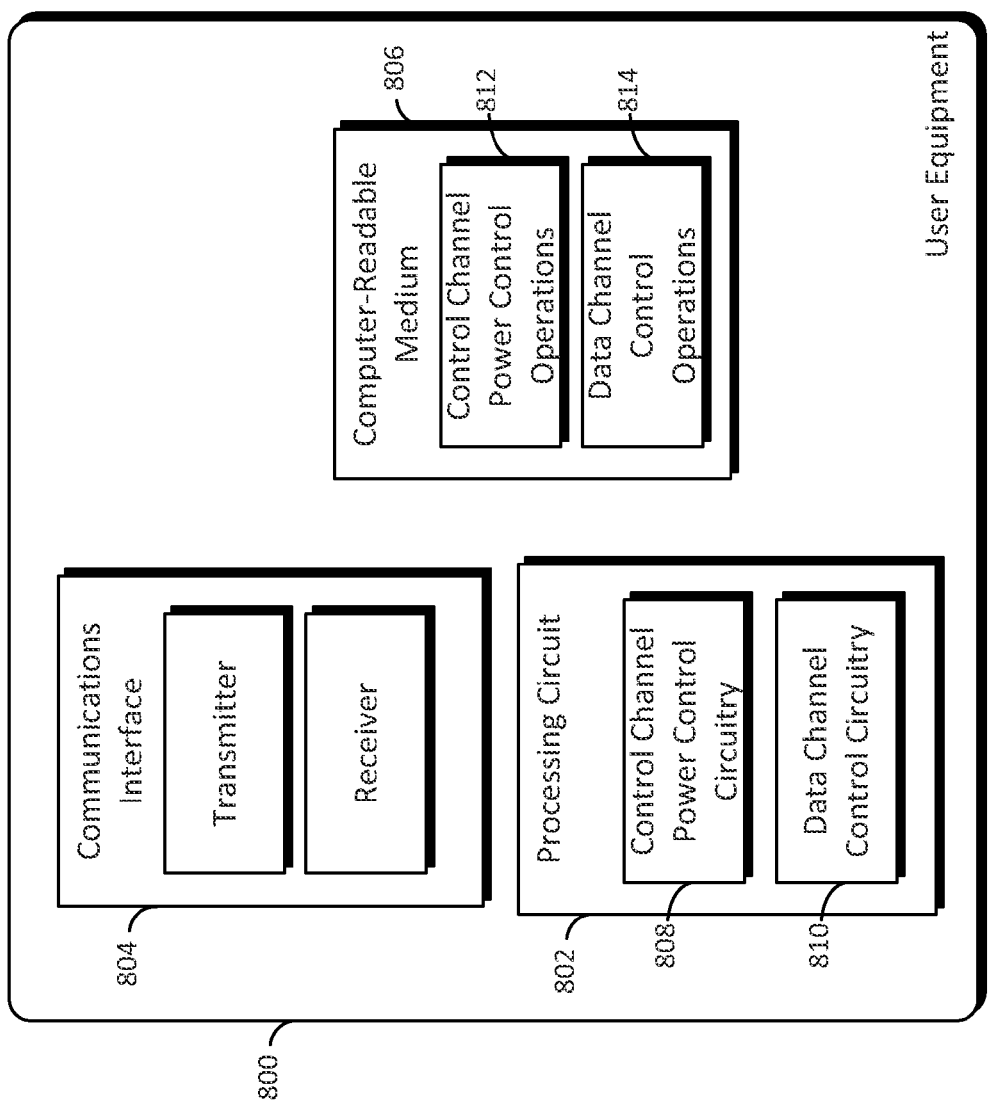
FIG. 8 is a simplified block diagram illustrating a UE according to one example.

FIG. 8 is a simplified block diagram illustrating some of the components of a UE 800 configured according to one or more aspects of the present disclosure. In various examples, the UE 800 may be configured to perform any one or more of the functions described above, and in particular, may implement part of the process illustrated in FIG. 10, described below.

The UE 800 includes a processing circuit 802 coupled to or placed in electrical communication with a communications interface 804 and a computer-readable medium 806. The processing circuit 802 may, in one or more examples, include control channel power control circuitry 808 and data channel control circuitry 810. The control channel power control circuitry 808 may be configured to determine a transmit power of one or more control channels, such as the HS-DPCCH, in accordance with information including a received power control command. In some examples, the control channel power control circuitry 808 may determine a power in accordance with a received control-to-pilot (c2p) ratio, received from a serving HS-DSCH cell, as well as a pilot power. The data channel control circuitry 810 may be configured to determine one or more characteristics of one or more data channels, such as the DPDCH and/or the E-DCH (i.e., the E-DPDCH and/or the E-DPCCH), in accordance with information including a received power control command. In some examples, the data channel control circuitry 810 may determine one or more characteristics of a data channel transmission (e.g., a power, a packet size, and/or a data rate) in accordance with one or more of a traffic-to-pilot (t2p) ratio or a transport block size (TBS) index received from a non-serving cell (e.g., a neighbor cell), and/or a pilot power. In another example, the data channel control circuitry 810 may be configured to autonomously determine a t2p power ratio for the UE 800 in accordance with a received target block error rate (BLER), which may be indicated by a non-serving cell.

The computer-readable medium 806 may, in one or more examples, include control channel power control operations 812 and data channel control operations 814. The control channel power control operations 812 may be configured to determine a transmit power of one or more control channels, such as the HS-DPCCH, in accordance with information including a received power control command. In some examples, the control channel power control operations 812 may determine a power in accordance with a received control-to-pilot (c2p) ratio, received from a serving HS-DSCH cell, as well as a pilot power. The data channel control operations 814 may be configured to determine one or more characteristics of one or more data channels, such as the DPDCH and/or the E-DCH (i.e., the E-DPDCH and/or the E-DPCCH), in accordance with information including a received power control command. In some examples, the data channel control operations 814 may determine one or more characteristics of a data channel transmission (e.g., a power, a packet size, and/or a data rate) in accordance with one or more of a traffic-to-pilot (t2p) ratio or a transport block size (TBS) index received from a non-serving cell (e.g., a neighbor cell), and/or a pilot power.

The communications interface 804 is configured to facilitate wireless communications of the UE 800. For example, the communications interface 804 may include circuitry and/or programming adapted to facilitate the communication of information bi-directionally with respect to one or more wireless network devices (e.g., network nodes). The communications interface 804 may be coupled to one or more antennas (not shown), and includes wireless transceiver circuitry, including at least one receiver circuit and/or at least one transmitter circuit.

Figure 9:
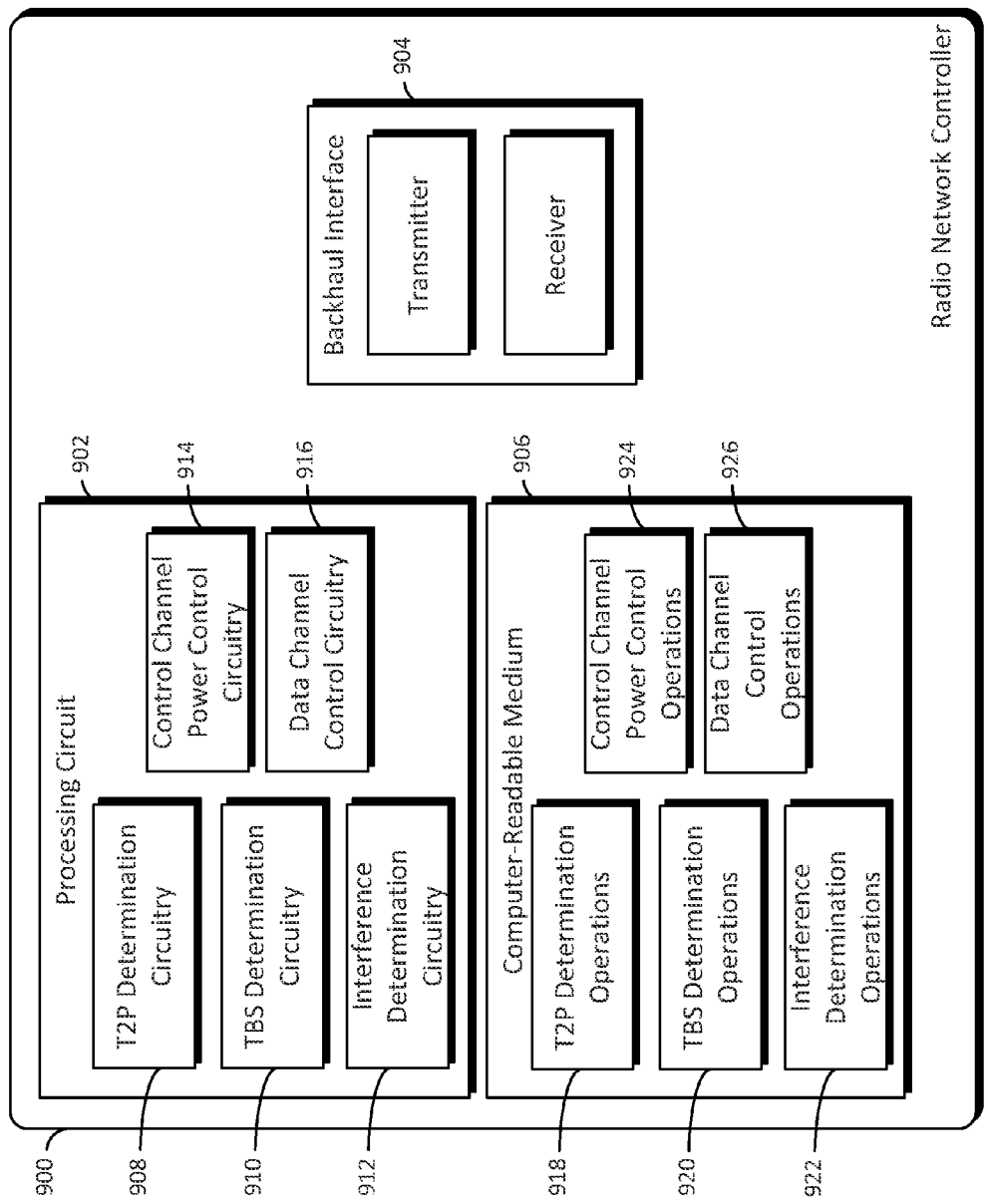
FIG. 9 is a simplified block diagram illustrating an RNC according to one example.

FIG. 9 is a simplified block diagram illustrating some of the components of an RNC 900 configured according to one or more aspects of the present disclosure. In various examples, the RNC 900 may be configured to perform any one or more of the functions described above, and in particular, may implement part of the process illustrated in FIGS. 10 and 11, described below.

The RNC 900 includes a processing circuit 902 coupled to or placed in electrical communication with a backhaul interface 904 and a computer-readable medium 906. The processing circuit 902 may, in one or more examples, include t2p determination circuitry 908, TBS determination circuitry 910, interference determination circuitry 912, control channel power control circuitry 914, and data channel power control circuitry 916. The interference determination circuitry 912 may be configured to determine an amount of interference at one or more Node Bs within the RNS corresponding to the RNC 900, e.g., utilizing the backhaul interface 904 to communicate with the respective Node Bs. The interference may be included in an SNR determination for the respective Node Bs, and may be utilized in an open loop and/or a closed loop power control algorithm corresponding to the Node Bs. The t2p determination circuitry 908 may be configured to determine a t2p power ratio for a particular UE in the RNS, in accordance with the interference information determined by the interference determination circuitry 912. Similarly, the TBS determination circuitry 910 may be configured to determine a TBS for a particular UE in the RNS, in accordance with the interference information determined by the interference determination circuitry 912. The control channel power control circuitry 914 may generate power control commands to be sent to a UE, e.g., corresponding to the determined t2p power ratio. For example, the control channel power control circuitry 914 may be configured to control the power of HS-DPCCH transmissions of a UE. The data channel control circuitry 916 may generate control commands to be sent to a UE, e.g., corresponding to one or more of the determined t2p power ratio and/or the determined TBS.

The computer-readable medium 906 may, in one or more examples, include t2p determination operations 918, TBS determination operations 920, interference determination operations 922, control channel power control operations 924, and data channel power control operations 926. The interference determination operations 922 may be configured to determine an amount of interference at one or more Node Bs within the RNS corresponding to the RNC 900, e.g., utilizing the backhaul interface 904 to communicate with the respective Node Bs. The interference may be included in an SNR determination for the respective Node Bs, and may be utilized in an open loop and/or a closed loop power control algorithm corresponding to the Node Bs. The t2p determination operations 918 may be configured to determine a t2p power ratio for a particular UE in the RNS, in accordance with the interference information determined by the interference determination operations 922. Similarly, the TBS determination operations 920 may be configured to determine a TBS for a particular UE in the RNS, in accordance with the interference information determined by the interference determination operations 922. The control channel power control operations 924 may generate power control commands to be sent to a UE, e.g., corresponding to the determined t2p power ratio. For example, the control channel power control operations 924 may be configured to control the power of HS-DPCCH transmissions of a UE. The data channel control operations 926 may generate control commands to be sent to a UE, e.g., corresponding to one or more of the determined t2p power ratio and/or the determined TBS.

Figure 10:
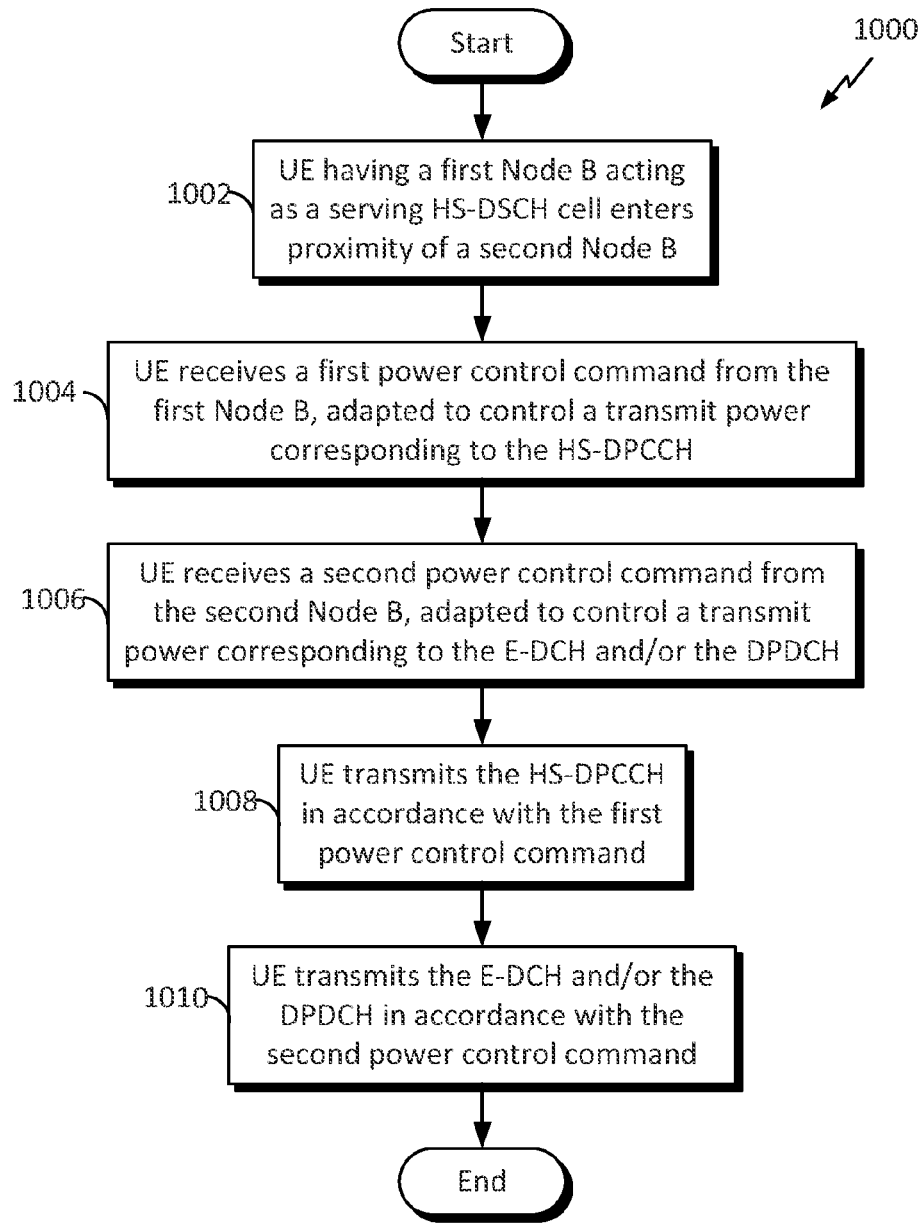
FIG. 10 is a flow chart illustrating a process for power controlling a UE in accordance with one example.

FIG. 10 is a flow diagram illustrating an exemplary process of controlling the transmission power of a UE in a heterogeneous network according to some aspects of the disclosure. In some examples, at least a portion of the illustrated process 1000 may be operable at a UE such as the UEs illustrated in FIG. 2, 3, 4, 7, or 8, described above. In some examples, at least a portion of the illustrated process 1000 may be operable at an RNC such as the RNCs illustrated in FIG. 2 or 9, described above. In some examples, the illustrated process 1000 may be operable at a processor 104, which in some further examples may implement instructions stored on a computer-readable medium 106, as described above. In other examples, the illustrated process 1000 may be operable at any suitable apparatus or means for carrying out the described functions.

At step 1002, a UE 450, having a first Node B (e.g., a high-power Node B such as a macrocell) acting as a serving HS-DSCH cell enters within a certain proximity of a second Node B (e.g., a low-power Node B such as a picocell or femtocell). As one nonlimiting example, with reference to FIG. 7, the UE may enter a region between the uplink boundary and the downlink boundary, such that the downlink signal received from the first Node B that is the serving HS-DSCH cell for the UE remains the stronger downlink signal, but the uplink signal transmitted from the UE is stronger at the second Node B.

At any time, the SNR detected at any base station may vary over time. Similarly, at any time, the target SNR determined by a network node such as an RNC may vary over time. Therefore, based on these or other parameters, the serving HS-DSCH cell, or a non-serving cell receiving uplink transmissions from the UE, may determine to transmit a power control command to the UE.

Thus, at step 1004, the UE may receive a first power control command from the first Node B, where the first power control command is adapted to control a transmit power corresponding to a first set of channels. In one nonlimiting example, the first set may include one or more control channels, such as the HS-DPCCH. In this way, when the first Node B is the serving HS-DSCH cell, the first Node B may have a better capability to maintain the quality of the HS-DPCCH, so that the channel quality information and acknowledgments (CQI and HARQ ACK/NACK) may be properly received, ensuring that the high-speed downlink from the serving HS-DSCH cell may be maintained.

At step 1006, the UE may receive a second power control command from the second Node B, where the second power control command is adapted to control one or more characteristics, such as a transmit power and/or a packet size, corresponding to a second set of channels. In one nonlimiting example, the second set may include one or more data channels, such as the DPDCH and/or the E-DCH (i.e., the E-DPCCH and/or the E-DPDCH). Furthermore, as described above, the second power control command received from the second Node B may be configured to increase or decrease the TBS on the E-DPDCH; may be configured to increase or decrease the t2p power ratio utilized by the UE for transmission of the E-DPDCH; or some combination of the above. In some examples, the second power control command received from the second Node B may correspond to a target block error rate (BLER), such that the UE may accordingly autonomously increase or decrease the t2p ratio and/or the TBS to maintain the BLER indicated by the second Node B.

In this way, when the second Node B is a non-serving cell for the UE, but the second Node B is in relatively close proximity to the UE and receiving uplink data channel transmissions from the UE, the second Node B may have a better capability to control characteristics of those transmissions, e.g., to maintain the detected SNR at a suitable level.

In various examples within the scope of the present disclosure, any suitable channel may be utilized by the first Node B and the second Node B for the respective transmissions of the first and second power control commands. As one illustrative example, one or both of the power control commands may be carried on an F-DPCH. Of course, this is merely one example and any suitable channel may be utilized for power control commands.

At step 1008 the UE may transmit the first set of channels in accordance with the first power control command received from the first Node B at step 1004. For example, at step 1008 the UE may transmit the HS-DPCCH, carrying information such as a CQI and/or a HARQ ACK/NACK message corresponding to a received downlink transmission on the HS-DPDCH from the first Node B. Here, because the HS-DPCCH transmission is power controlled by the serving HS-DSCH cell (i.e., the first Node B), the serving HS-DSCH cell is better able to ensure that the feedback carried on the HS-DPCCH is properly received.

At step 1010, the UE 450 may transmit the second set of channels in accordance with the second power control command received from the second Node B. For example, at step 1010 the UE may transmit the DPDCH and/or the E-DCH (i.e., the E-DPDCH and/or the E-DPCCH), carrying uplink data, which may be received by one or more Node Bs in soft handover, in some examples including but not necessarily limited to the second Node B. Here, because these data transmissions are be power controlled by the second Node B, the second Node B is better able to control the SNR within its cell in accordance with open-loop and closed-loop power control algorithms. More specifically, because these power control commands may be originated at the RNC that controls the second Node B, the RNC may be better able to control the SNR within its RNS, which includes the second Node B.

Figure 11:
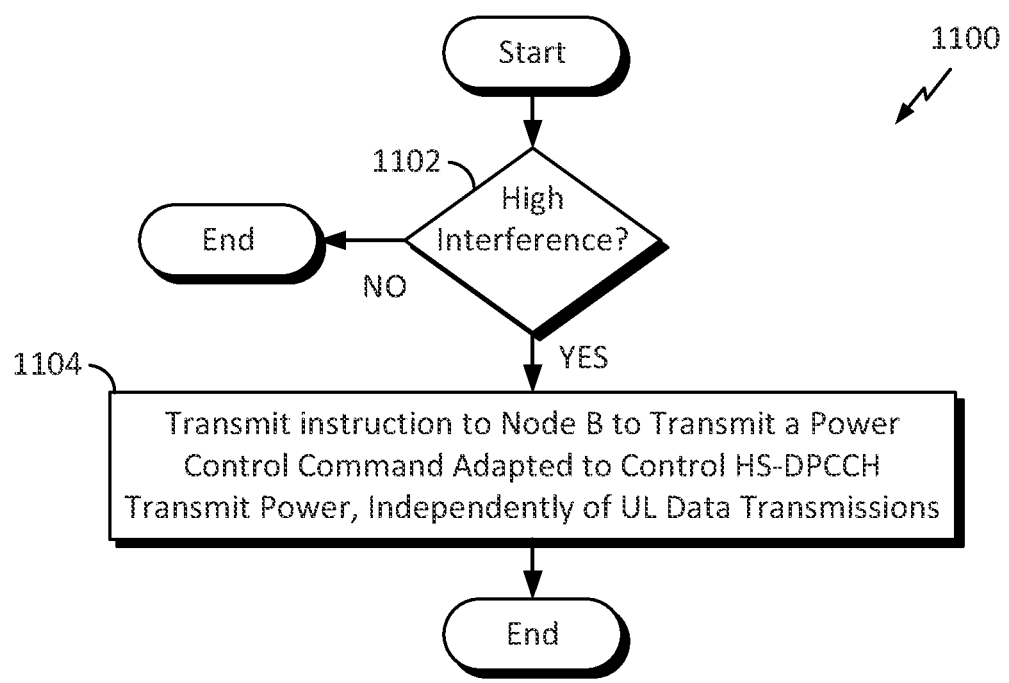
FIG. 11 is a flow chart illustrating a process for power controlling a UE in accordance with one example.

FIG. 11 is a flow diagram illustrating an exemplary process of controlling the transmission power of a UE in a heterogeneous network according to some aspects of the disclosure. In some examples, at least a portion of the illustrated process 1100 may be operable at an RNC such as the RNCs illustrated in FIG. 2 or 9, described above. In some examples, the illustrated process 1100 may be operable at a processor 104, which in some further examples may implement instructions stored on a computer-readable medium 106, as described above. In other examples, the illustrated process 1100 may be operable at any suitable apparatus or means for carrying out the described functions.

At step 1102, the RNC may determine whether a first cell in an RNS corresponding to the RNC is experiencing a high level of interference from a particular UE. If yes, then at step 1104 the RNC may transmit an instruction to the Node B corresponding to the first cell to transmit a power control command adapted to control a transmit power corresponding to one or more channels for control information corresponding to a received downlink transmission, independently of a transmit power for the UE corresponding to one or more channels for uplink data transmission. As one example, the power control command may be configured to control the HS-DPCCH transmit power, independently of the UE's E-DCH and/or DPDCH transmit power. Here, the power control command may include any one or more of a t2p power ratio, a TBS, and/or a target BLER based on which the UE may autonomously determine its own t2p power ratio and/or TBS.

Several aspects of a telecommunications system have been presented with reference to a W-CDMA system. As those skilled in the art will readily appreciate, various aspects described throughout this disclosure may be extended to other telecommunication systems, network architectures and communication standards that employ different sets of channels, such as data channels and control channels.

By way of example, various aspects may be extended to other UMTS systems such as TD-SCDMA and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of wireless communication operable at a user equipment (UE), comprising:
   receiving a first power control command configured to control at least one of a traffic-to-pilot (t2p) power ratio or a transport block size (TBS) index corresponding to a first set of channels comprising an enhanced uplink dedicated channel (E-DCH);
   receiving a second power control command comprising a target block error rate (BLER), configured to control a transmit power corresponding to a second set of channels comprising a high-speed dedicated physical control channel (HS-DPCCH);
   transmitting the first set of channels in accordance with the first power control command;
   determining one or more of a traffic to pilot (t2p) power ratio or a transport block size (TBS) index for the transmission of the second set of channels in accordance with the received target BLER; and
   transmitting the second set of channels in accordance with the second power control command.

2. The method of claim 1, wherein the first set of channels further comprises a Release-99 dedicated channel (DCH).

3. The method of claim 1, wherein the second power control command comprises a control-to-pilot (c2p) power ratio.

4. The method of claim 1, wherein the first power control command is received from a first base station and wherein the second power control command is received from a second base station.

5. The method of claim 4, wherein the second base station is a serving high-speed dedicated shared channel (HS-DSCH) cell, and wherein the first base station is a neighbor cell.

6. A wireless user equipment (UE), comprising:
   means for receiving a first power control command configured to control at least one of a traffic-to-pilot (t2p) power ratio or a transport block size (TBS) index corresponding to a first set of channels comprising an enhanced uplink dedicated channel (E-DCH);
   means for receiving a second power control command comprising a target block error rate (BLER), configured to control a transmit power corresponding to a second set of channels comprising a high-speed dedicated physical control channel (HS-DPCCH);
   means for transmitting the first set of channels in accordance with the first power control command;
   means for determining one or more of a traffic to pilot (t2p) power ratio or a transport block size (TBS) index for the transmission of the second set of channels in accordance with the received target BLER; and
   means for transmitting the second set of channels in accordance with the second power control command.

7. The UE of claim 6, wherein the first set of channels further comprises a Release-99 dedicated channel (DCH).

8. The UE of claim 6, wherein the second power control command comprises a control-to-pilot (c2p) power ratio.

9. The UE of claim 6, wherein the first power control command is received from a first base station and wherein the second power control command is received from a second base station.

10. The UE of claim 9, wherein the second base station is a serving high-speed dedicated shared channel (HS-DSCH) cell, and wherein the first base station is a neighbor cell.

11. A wireless user equipment (UE), comprising:
    at least one processor;
    a memory coupled to the at least one processor; and a communications interface coupled to the at least one processor, wherein the at least one processor is configured to:
    receive a first power control command configured to control at least one of a traffic-to-pilot (t2p) power ratio or a transport block size (TBS) index corresponding to a first set of channels comprising an enhanced uplink dedicated channel (E-DCH);
    receive a second power control command comprising a target block error rate (BLER), configured to control a transmit power corresponding to a second set of channels comprising a high-speed dedicated physical control channel (HS-DPCCH);
    transmit the first set of channels in accordance with the first power control command;
    determine one or more of a traffic to pilot (t2p) power ratio or a transport block size (TBS) index for the transmission of the second set of channels in accordance with the received target BLER; and
    transmit the second set of channels in accordance with the second power control command.

12. The UE of claim 11, wherein the first set of channels further comprises a Release-99 dedicated channel (DCH).

13. The UE of claim 11, wherein the second power control command comprises a control-to-pilot (c2p) power ratio.

14. The UE of claim 11, wherein the first power control command is received from a first base station and wherein the second power control command is received from a second base station.

15. The UE of claim 14, wherein the second base station is a serving high-speed dedicated shared channel (HS-DSCH) cell, and wherein the first base station is a neighbor cell.

16. A non-transitory computer readable medium operable at a wireless user equipment (UE), comprising:

instructions for causing a computer to receive a first power control command configured to control at least one of a traffic-to-pilot (t2p) power ratio or a transport block size (TBS) index corresponding to a first set of channels comprising an enhanced uplink dedicated channel (E-DCH);

instructions for causing a computer to receive a second power control command comprising a target block error rate (BLER), configured to control a transmit power corresponding to a second set of channels comprising a high-speed dedicated physical control channel (HS-DPCCH);

instructions for causing a computer to transmit the first set of channels in accordance with the first power control command;

instruction for determining one or more of a traffic to pilot (t2p) power ratio or a transport block size (TBS) index for the transmission of the second set of channels in accordance with the received target BLER; and instructions for causing a computer to transmit the second set of channels in accordance with the second power control command.

17. The non-transitory computer readable medium of claim 16, wherein the first set of channels further comprises a Release-99 dedicated channel (DCH).

18. The non-transitory computer readable medium of claim 16, wherein the second power control command comprises a control-to-pilot (c2p) power ratio.

19. The non-transitory computer readable medium of claim 16, wherein the first power control command is received from a first base station and wherein the second power control command is received from a second base station.

20. The non-transitory computer readable medium of claim 19, wherein the second base station is a serving high-speed dedicated shared channel (HS-DSCH) cell, and wherein the first base station is a neighbor cell.

* * * * *